D. H. RATHBONE.
METER.
APPLICATION FILED DEC. 30, 1920.
1,406,682. Patented Feb. 14, 1922.
2 SHEETS—SHEET 1.
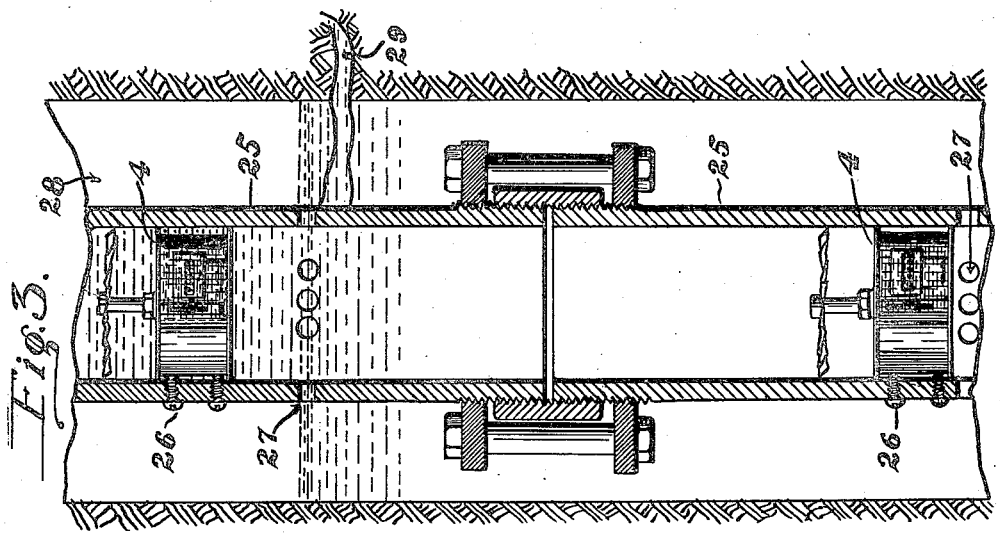
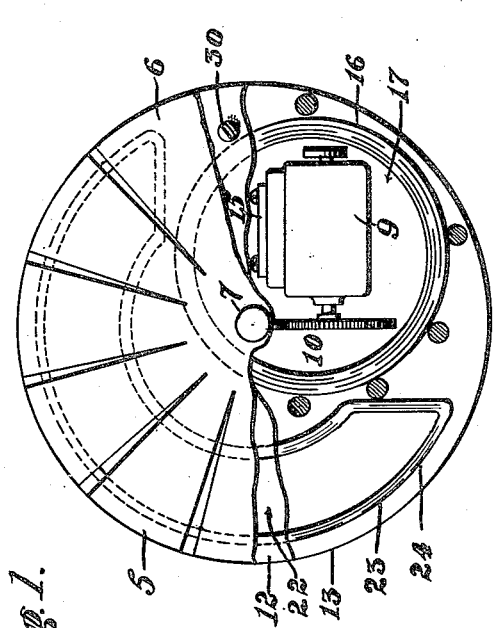
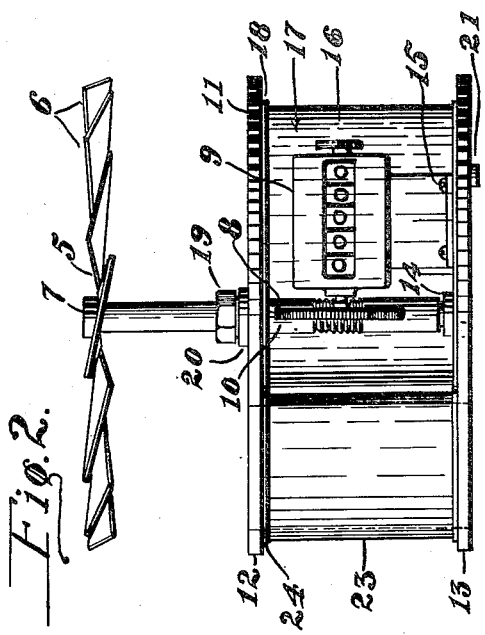
Inventor
David H. Rathbone
Attorney

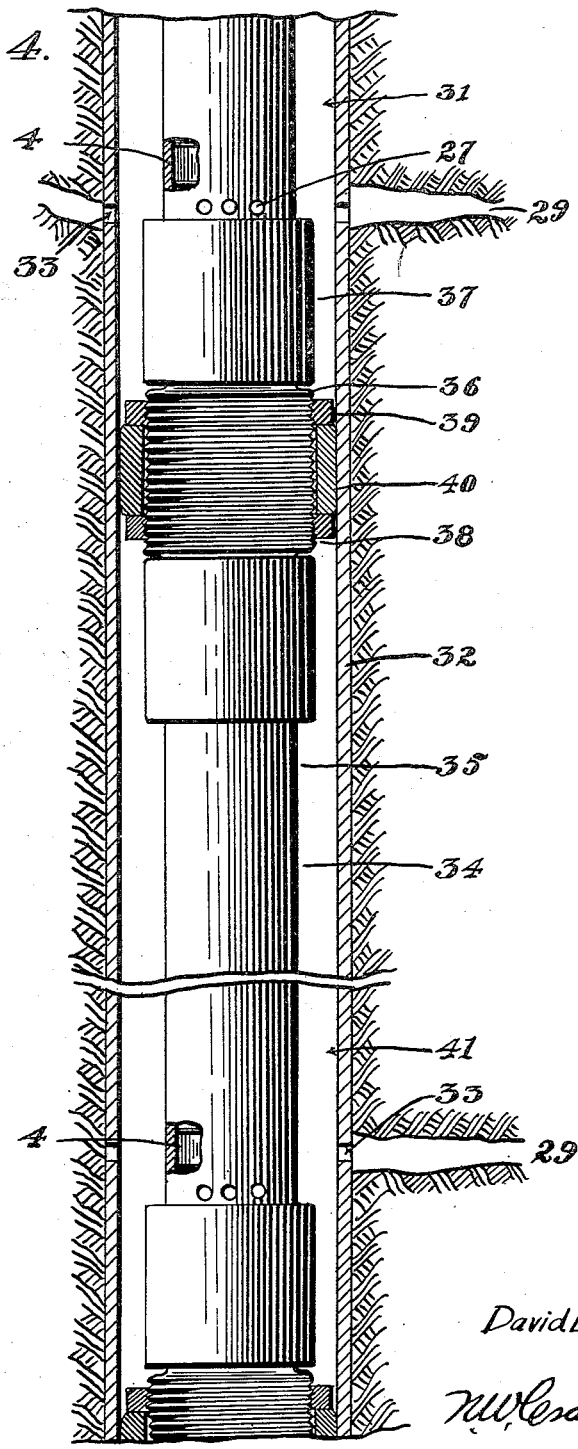

UNITED STATES PATENT OFFICE.

DAVID H. RATHBONE, OF LOS ANGELES, CALIFORNIA.

METER.

1,406,682.  Specification of Letters Patent.  Patented Feb. 14, 1922.

Application filed December 30, 1920. Serial No. 434,038.

*To all whom it may concern:*

Be it known that I, DAVID H. RATHBONE, a citizen of the United States, residing at Los Angeles, in the county of Los Angeles and State of California, have invented new and useful Improvements in Meters, of which the following is a specification.

This invention relates to flow meters.

An object of this invention is to provide a means for determining the location of subterranean water courses intercepted by a well.

Another object is to provide a means for determining the relative amount of seepage at various points in a well's shaft.

A further object is to provide a flow meter to resist the high pressures encountered in deep wells.

In drilling of oil wells, the shaft generally intercepts subterranean streams of water during the drilling operations. Inasmuch as a constant circulation of water is maintained in the shaft during drilling operations, in order to carry out earth removed by the drills, it is not known at which point these streams are intercepted and the location of such streams cannot ordinarily be determined with any degree of accuracy. When drilling operations are ceased it is necessary to line the portions of the shaft at which these streams enter to close these water courses. Since it is difficult to determine the exact location of these water courses much unnecessary lining is done before the seepage of water is closed off. It is the object of this invention to provide a method of definitely locating all points of seepage as well as to determine the relative amount of water flowing in the various locations, in order to facilitate lining of the shaft at the necessary points.

Other objects will appear hereinafter.

The invention is illustrated in the accompanying drawings, in which:

Figure 1 is a plan view with a part broken away showing a meter adapted to carry out the purpose of this invention.

Figure 2 is a front elevation of the meter shown in Figure 1.

Figure 3 is a sectional view of a well shaft illustrating the application of the meter shown in Figures 1 and 2 to carry out the purpose of this invention.

Figure 4 is a view in vertical section of well shaft showing the application of the invention to a well shaft having a casing.

More specifically, 4 indicates a flow meter having a rotor 5 of the screw blade type adapted to be rapidly rotated by a flow of water passing the blades 6. These blades are of any suitable construction but are here shown as being formed in whole from a single circular disc. A hub 7 is provided on this rotor and is an integral part thereof. A worm shaft 8 is forced into the hub and this shaft rotates with the rotor. A usual type of revolution counter 9 is operated by a pinion gear 10 which engages the worm shaft 8 and is rotated thereby in a manner well known, thus the rotations of the rotor operate the revolution counter. The moving parts are held in place by a meter casing 11 which comprises two circular discs 12 and 13, the lower disc having a bearing 14 formed integral therewith in which the rotor shaft revolves. This lower disc also serves to support the revolution counter, a bracket being secured thereto by screws 15, this bracket engaging the counter by similar screws. Interposed between the upper and lower discs is a circular glass tube 16 which completely encircles the worm shaft 8, the pinion gear 10, and the counter 9 forming a fluid tight compartment 17, rubber gaskets 18 being inserted between the edges of the glass tube and the disc to insure against leakage. Surrounding the rotor shaft is a packing nut 19 which is threaded to engage a gland 20 formed integral with the disc 12 to provide a stuffing box to prevent leakage past the rotor shaft, but permitting of easy rotation of this shaft. The fluid compartment 17 is normally filled with a suitable transparent fluid to prevent water coming in contact with the enclosed parts and to further provide from crushing the glass tube. A filler plug 21 is provided for the purpose of filling and removing the fluid, this fluid used being transparent to permit of reading the counter.

Openings 22 are provided in the upper and lower discs occupying a segmental portion thereof. Interposed between the discs is a seamless tube 23 formed with a cross section conforming with these openings, the tube extending from one disc to the other to form a defined fluid passage. Gaskets 24 are interposed between the tube and the disc and are adapted to take up equally with the rubber gaskets 18.

25 indicates a suction pipe in which the meters 4 are disposed at suitable distances and are secured therein by screws 26 which pass through the walls of the suction pipe and engage the tube 23. This suction pipe is provided with annular series of openings 27 here shown as comprising drilled holes situated immediately below the meter. This suction pipe is shown in a well shaft 28 which has intercepted a water course 29 causing the shaft to fill with water as indicated.

Reference being had to Figure 4, another well shaft 31 is shown as being lined with a casing 32 which is provided with a series of openings 33 spaced apart at suitable distances. Within this shaft is shown a suction line 34 which is made up of lengths of pipe 35. Between each length of pipe externally threaded nipples 36 are interposed. These nipples are connected to the pipe length by internally threaded couplings 37. A portion of these nipples is of enlarged diameter and provided with external threads 38 which receive two internally threaded nuts 39. Surrounding each nipple are rubber collars 40 which are adapted to close the space between the nipple and the inner surface of the casing, thus providing isolated spaces 41 between each length of pipe. The meters are placed in each pipe just above the coupling and each pipe is provided with openings 27 to admit water to the suction line. This shaft is shown as having intercepted two water caurses 29—29.

In the application of the meters, these meters are all calibrated alike and the counters are set at zero. The fluid compartment is then completely filled with a transparent fluid. By tightening the screws 30 the discs are forced against the gaskets which take up slightly and cause the fluid to completely occupy this space and to act as an incompressible mass to resist external pressures. These meters are disposed in the suction pipe at suitable distances apart according to the degree of accuracy of location required. The suction line is then lowered to the bottom of the shaft and is connected at its upper end to a suitable pump, not shown. As the water flows upward through the suction pipe it passes respectively through the water passage in each meter and in passing the rotor will cause it to rotate and the revolutions thereof are recorded by the counter. It is not essential to have the counter calibrated to register in any given unit of water, the object being essentially to determine the relative amount of water passing each meter. When the head of the water is sufficient to carry it out of the well no pump is required.

Assuming an instance such as that illustrated in Figure 3; when pumping operation begins the water will flow from the shaft, through the openings in the pipe and thence upward. This upward flow will actuate all meters situated above the water course which is feeding the water. That water which occupies the shaft below the water course will be motionless and the lower meter will not be actuated, the normal tendency of the water being to pass directly from the water course to the suction pipe through the first series of holes above it. Pumping is continued until it is evident that the shaft cannot be emptied of water, indicating that a subterranean water supply exists. Should the pump displace water faster than the water course supplies the shaft, the water level will be gradually lowered until it is down to the first annular series of ports, as shown in Figure 3. When the level drops below this the pump will draw air and cease to lift water.

The suction pipe is then withdrawn and the respective readings of the meters are noted, comparison being made successively from the lowermost meter upward. The first meter nearest the ground will indicate the total water pumped. When there is only one water course feeding the well such as shown in Figure 3, the meters below the course will not register inasmuch as no water will flow through them. The meter immediately above the holes will register, indicating that the water course is located between the two meters shown, and thus location is very accurately determined.

The first meter that shows any appreciable flow of water indicates that a water course exists immediately below the point at which that meter was situated in the well shaft. Other meters above that meter showing an appreciable increase in flow over those below indicate the presence of another water course above. Thus by making a comparison of all meters beginning from the bottom upward, the locations of each water flow is determined and if the total water pumped is known at the ground the flow from each water course is readily determined in any unit of measurement.

In the application of this invention to a well having a casing it is proposed to provide the casing with openings spaced apart a suitable distance so that water may flow in from the nearest water course. Before the suction line 34 is lowered into the cased well the nuts 39 are adjusted so as to force the rubber collar outward until it is a snug fit in the casing. The suction pipe is then lowered and the water in the shaft is then pumped up through the suction line or otherwise caused to flow upward.

Water entering the shaft from the lowermost water course shown in Figure 4 will flow through the openings in the casing and the suction line and actuate the meter. Since the collar 40 provides an isolated space 41 between each meter it is not possible for any water to flow from the lowermost course to a meter above it without first entering the suction line and passing through meters in proximity to it. Thus the flow of water from any one course is accurately recorded.

By comparison of the meters, the location of the water courses are determined in the same manner as described for the uncased well.

These methods of determining relative flows may be used in artesian wells as well as oil wells, and may also be used for obtaining geological data and the like, and the rubber collars may also be employed in encased wells.

Whereas, I have shown and described a specific construction of meter, it is obvious that any type of flow meter may be used in a perforated suction pipe to carry out the purpose of the invention, and whereas, I have shown and described the fluid filled compartment adapted to resist external pressure as applied to a specific construction of meters, this salient feature may be employed in any type of meter for protecting the moving parts from water and particles carried therewith.

It is to be understood that a metallic tube may be substituted for glass in the construction of the casing when desired, said tube being provided with an aperture for the purpose of reading the counter, and suitable closure therefor.

I claim:

1. Means for locating subterranean water courses in well shafts, said means comprising a suction pipe adapted to conduct water to the surface, and a plurality of flow meters spaced apart in said suction pipe, said suction pipe formed with openings disposed between the respective meters.

2. Means for locating subterranean water courses in well shafts, said means comprising a suction pipe adapted to conduct water to the surface, a plurality of flow meters spaced apart in said suction pipe, said suction pipe formed with openings disposed between the respective meters, and expandible collars situated below each meter and surrounding said suction pipe to completely fill the intervening space between said suction pipe and the inner wall of a well's shaft.

3. In a flow meter, the combination of a revolution counter, a pinion gear adapted to actuate said counter, a rotor adapted to be revolved by a flow of water, a worm shaft secured to said rotor and operably engaging said pinion gear, a fluid filled casing having translucent walls surrounding said counter and pinion gear, and a stuffing box to said casing to permit said worm shaft to extend external to said casing to engage said rotor.

4. In a flow meter, the combination of a meter casing comprising two circular discs and a metallic tube held between said discs to provide a fluid tight compartment, a revolution counter situated within said compartment, a stuffing box in one of said discs, a rotatable shaft operatively connected to the revolution counter and extending outward from said casing through said stuffing box, and a rotor secured to said shaft.

DAVID H. RATHBONE.